(12) United States Patent
Mackman et al.

(10) Patent No.: US 10,185,304 B2
(45) Date of Patent: Jan. 22, 2019

(54) TIMING A MACHINE TOOL USING AN ACCELEROMETER

(71) Applicant: Delcam Limited, Birmingham, West Midlands (GB)

(72) Inventors: Stephen William Mackman, Birmingham (GB); Steven Michael Hobbs, Birmingham (GB); William del Strother, Birmingham (GB)

(73) Assignee: Delcam Limited, Birmingham, West Midlands (GB)

( * ) Notice: Subject to any disclaimer, the term of this patent is extended or adjusted under 35 U.S.C. 154(b) by 593 days.

(21) Appl. No.: 14/882,306

(22) Filed: Oct. 13, 2015

(65) Prior Publication Data

US 2016/0041547 A1 Feb. 11, 2016

Related U.S. Application Data

(63) Continuation-in-part of application No. 13/848,719, filed on Mar. 21, 2013, now Pat. No. 9,625,897.

(30) Foreign Application Priority Data

Mar. 21, 2012 (GB) .................................. 1204908.6

(51) Int. Cl.
*G05B 19/4093* (2006.01)
*G06F 19/00* (2018.01)

(52) U.S. Cl.
CPC .................... *G05B 19/4093* (2013.01); *G05B 2219/36252* (2013.01); *G05B 2219/36253* (2013.01);
(Continued)

(58) Field of Classification Search
CPC ...... G05B 19/4093; G05B 2219/36252; G05B 2219/36253; G05B 2219/36289; G05B 2219/45145; Y20P 90/265
(Continued)

(56) References Cited

U.S. PATENT DOCUMENTS 3,641,872 A 2/1972 Ulfhielm
4,079,235 A 3/1978 Froyd et al.
(Continued)

FOREIGN PATENT DOCUMENTS

DE 19624131 12/1997
DE 102006058707 6/2008
(Continued)

OTHER PUBLICATIONS

Budak et al., "Analysis and compensation of mass loading effect of accelerometers on tool point FRF measurements for chatter stability predictions"; International Journal of Machine Tools & Manufacture, 5pg. (Year: 2010).*
(Continued)

*Primary Examiner* — Ryan D. Coyer
(74) *Attorney, Agent, or Firm* — Fish & Richardson P.C.

(57) ABSTRACT

A method includes: selecting a movement path for a moving component of a machine tool; either before or after the movement path, causing the moving component to make a first predefined movement; before the movement path, causing the moving component to make a second predefined movement; after the movement path, causing the moving component to make a third predefined movement; recording, using a computing device including one or more accelerometers, movement data resulting from the first, second and third predefined movements, and from the movement path; analyzing the movement data by finding waveforms to identify a start point, a finish point, and which one of the
(Continued)

predefined movement paths in the set was selected; calculating timing information based on the identified start and end points, and the identified one of the predefined movement paths in the set; and determining performance limits of the machine tool based on the timing information.

18 Claims, 8 Drawing Sheets

(52) U.S. Cl.
    CPC ............. *G05B 2219/36289* (2013.01); *G05B 2219/45145* (2013.01); *Y02P 90/265* (2015.11)

(58) Field of Classification Search
    USPC ........................................................ 700/174
    See application file for complete search history.

(56) References Cited

U.S. PATENT DOCUMENTS

| | | | |
|---|---|---|---|
| 4,445,182 A | | 4/1984 | Morita et al. |
| 4,533,286 A | | 8/1985 | Kishi et al. |
| 4,559,600 A | * | 12/1985 | Rao .................... G05B 19/4163 340/680 |
| 4,833,617 A | | 5/1989 | Wang |
| 4,949,270 A | | 8/1990 | Shima et al. |
| 5,251,144 A | | 10/1993 | Ramamurthi |
| 5,363,308 A | | 11/1994 | Guyder |
| 5,406,494 A | | 4/1995 | Schuett |
| 5,923,561 A | | 7/1999 | Higasayama et al. |
| 6,491,482 B1 | | 12/2002 | Fenkl et al. |
| 6,591,158 B1 | | 7/2003 | Bieterman et al. |
| 6,832,876 B2 | | 12/2004 | Hobbs |
| 7,933,679 B1 | | 4/2011 | Kulkarni et al. |
| 2001/0043842 A1 | | 11/2001 | Kaule et al. |
| 2002/0119020 A1 | | 8/2002 | Hobbs |
| 2003/0004605 A1 | | 1/2003 | Hamamura et al. |
| 2003/0110006 A1 | | 6/2003 | Nakamura |
| 2007/0046677 A1 | | 3/2007 | Hong et al. |
| 2009/0102411 A1 | | 4/2009 | Miller et al. |
| 2009/0105883 A1 | | 4/2009 | Miller et al. |
| 2010/0117835 A1 | * | 5/2010 | Nanikashvili ......... A61B 5/1112 340/573.1 |
| 2010/0204814 A1 | | 8/2010 | Neumaier et al. |
| 2011/0246132 A1 | * | 10/2011 | Sato ......................... B23Q 5/28 702/150 |
| 2013/0304247 A1 | | 11/2013 | Mackman et al. |

FOREIGN PATENT DOCUMENTS

| | | |
|---|---|---|
| EP | 1217482 | 6/2002 |
| GB | 1402233 | 8/1975 |
| GB | 1596135 | 8/1981 |
| GB | 2111249 | 6/1983 |
| GB | 2207776 | 2/1989 |
| GB | 2355316 | 4/2001 |
| GB | 2363208 | 12/2001 |
| JP | 60-56811 | 4/1985 |
| WO | 9905501 | 2/1999 |

OTHER PUBLICATIONS

Chen et al., "A tool breakage detection system using an accelerometer sensor"; Journal of Intelligent Manufacturing, 11pg. (Year: 1999).*

Ogedengbe, et al., "Feasibility of Tool Condition Monitoring on Micro-Milling Using Current Signals"; Au J.T., 12pg. (Year: 2011).*

Loin Precision, *Knowing your Machine Tool's Capabilities: Lean and Beyond*, Today's Medical Developments, Jun. 2011, 6 pages.

Fortang et al., *Command Shaping for Micro-mills and CNC Controllers*, 2005 American Control Conference, Jun. 8-10, Portland, Oregon, pp. 4531-4536.

Ruiz, et al., *A Real-time Tool Positioning Sensor for Machine-tools*, Sensors 2009, 9(10):7622-7647.

UK Patents Act 1977: Search Report under Section 17(6) of corresponding foreign application No. GB1204908.6 dated Nov. 8, 2012; total 3 pages.

UK Patents Act 1977: Search Report under Section 17(5) of corresponding foreign application No. GB1204908.6 dated Aug. 1, 2012; total 5 pages.

Tapie et al., *Circular Tests for HSM Machine Tools: Bore Machining Application*, International Journal of Machine Tools & Manufacture, Apr. 2007, 47(5):805-819.

Msaddek et al., *Modeling and Simulation of High-speed Milling Centers Dynamics*, International Journal of Advanced Manufacturing Technology, Apr. 2011, 53(9-12):877-888.

* cited by examiner

TIMING A MACHINE TOOL USING AN ACCELEROMETER

RELATED APPLICATIONS

This application is a continuation-in-part of U.S. patent application Ser. No. 13/848,719, filed Mar. 21, 2013, entitled "Method and System for Testing a Machine Tool," which claims priority to G.B. Patent Application No. 1204908.6, filed Mar. 21, 2012.

Both of the above-identified patent applications are hereby incorporated by reference in their entireties.

TECHNICAL FIELD

This specification relates to timing a machine tool using an accelerometer.

BACKGROUND

Testing a computer numerically controlled (CNC) machine, which is also referred to as a machine tool in this specification, often involves measuring the CNC machine's performance factors: for example, determining the maximum amount of force and torque a material mover controlled by the CNC machine can apply over a short time period; measuring the total amount of material the material remover can remove in a single pass; calculating the maximum speed at which a processing circuitry of the CNC machine can process programming instructions to guide the material remover's movements.

Timing a CNC machine's movements is often a prerequisite for measuring these factors.

SUMMARY

In general, this specification describes technologies for timing a machine tool using an accelerometer.

In general, an innovative aspect of the subject matter described in this specification can be embodied in methods that include the actions of methods, systems, and apparatus, including computer programs encoded on computer storage media, for timing a machine tool using an accelerometer. One of the methods includes: selecting a movement path along which a moving component of a machine tool, is to be moved; before moving the moving component: causing the moving component to make a first predefined movement; recording, using a computing device including accelerometers and external to the machine tool, first movement data identifying the first predefined movement; causing the moving component to make a second predefined movement; and recording, using the accelerometers, second movement data identifying the second predefined movement; causing the moving component to be moved along the movement path; after finishing moving the moving component along the movement path: causing the moving component to make a third predefined movement; and recording, using the accelerometers, third movement data identifying the third predefined movement; calculating, using the computing device, timing information for movement of the moving component along the movement path based on the first, second, and third movement data.

Other embodiments of this aspect include corresponding systems, apparatus, and computer programs recorded on one or more computer storage devices, each configured to perform the actions of the methods. For a system of one or more computers and machine tools to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. Programming a machine tool to time itself for a test run often requires special software or programming skills and may therefore be resource-consuming; in contrast, using an accelerometer and a data capture application already installed and programmed on a computing device, e.g., a smart phone, to time the machine tool can be more convenient. Also, a timing device or accelerometer installed on machine tools by machine manufacturers may lack customization or sophistication and is thus less equipped to time sophisticated machine movements; in contrast, a timing device or accelerometer provided by third parties can more aptly handle these situations.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A machine tool can include a moving component and a processing circuitry to control the moving component's movements about a material block. For example, a milling machine can include a material mover and a computer controlling, using computer programs, the material mover's movements about a metal block.

In accordance with instructions provided by a processing circuitry, a moving component can move about different axes, e.g., the X, Y, and Z axes. A series of related movements by a moving component is also referred to in this specification as a movement path. In a milling machine, for example, a material remover can rotate and move across a block of metal from which a metal part is being manufactured; these rotations and movements of the material mover are referred to as a cutting path.

A moving component's movements are limited by various factors, e.g., physical constraints and processing constraints. For example, a material mover's movements may be limited in the maximum amount of force and torque its motors can produce; a material remover can remove only a threshold amount of material in a single pass; and a material mover's movement speed may also be limited by how fast its processing circuitry can process computer programming instructions. Sometimes, however, a user is not aware of these constraints and a user-specified movement path (e.g., a cutting curve that a user mistakenly believes a material remover could follow) may cause a machine tool to exceed one of these constraints.

When a constraint is exceeded, a moving component may produce a compromised movement or movement path, different from the one specified by a user. For example, limited by its motor power, a material mover may accelerate at the rate of 1 cm/second$^2$, even when a user instructs, through a processing circuitry, the material mover to accelerate at the rate of 20 cm/second$^2$. For another example, when a movement path specified by a user includes a curve too sharp to accomplish, a moving component may produce a more gradual curve. None of these unintended results is desired, because compromised movements can adversely affect the quality of a manufactured part, which in turn can cause failures of the machine incorporating that part.

To design movement paths that a moving component is able to follow without unacceptable compromise, it is therefore desirable to determine one or more of the following performance limits of the machine tool:

1. for a given programmed feedrate, the minimum radius of arc that the machine tool can move in and still move at the programmed feedrate;
2. the minimum time per point that the machine tool can process;
3. the maximum point separation for a path to be treated as a continuous curve;
4. the maximum acceleration that the machine tool can achieve; and
5. the maximum jerk (e.g., change in acceleration, in terms of meter/second$^3$) that the machine tool can achieve. As will be appreciated, timing a machine tool's movements is a prerequisite for determining these performance limits.

Figure 1:
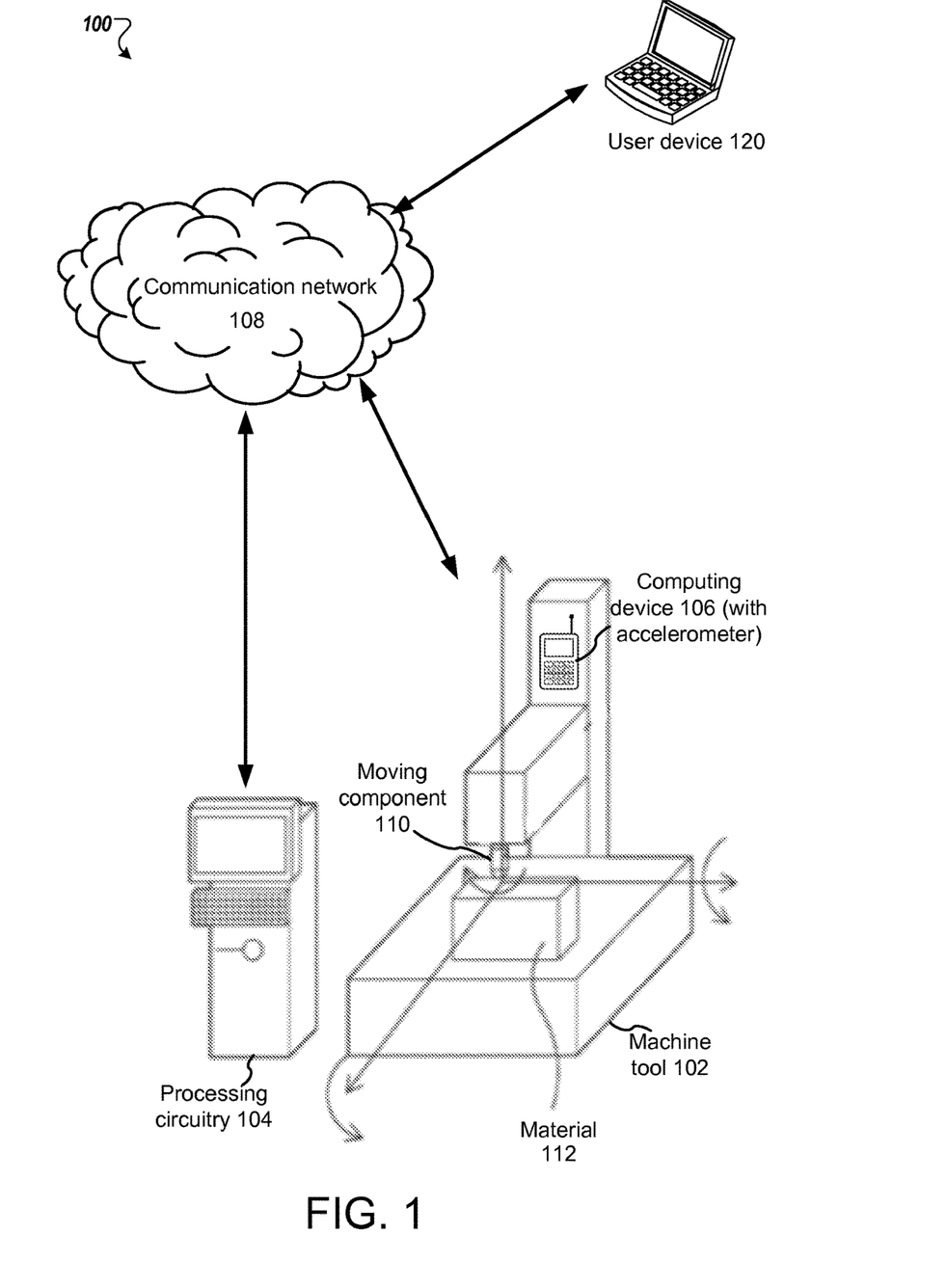
FIG. 1 is a block diagram showing an example of a system for timing a machine tool using an accelerometer.

FIG. 1 is a block diagram illustrating an example system 100 for timing a machine tool using an accelerometer. The system 100 can include a machine tool 102, a processing circuitry 104, an computing device 106 equipped with one or more accelerometers, a communication network 108, and optionally a user device 120.

The machine tool 102 includes a moving component 110, e.g., a material remover. The moving component 110 can rotate and move about a material 112, e.g., a metal block, in accordance with a movement path specified by a user through the processing circuitry 104.

The processing circuitry 104 can be a circuit or system of circuits performing a particular function in the machine tool 102. In some implementations, the processing circuitry 104 includes a processing unit, a graphics system, e.g., a display device, a hard drive, a memory, an I/O subsystem and a system bus. The processing unit, the graphics system, the hard drive, the memory, and the I/O subsystem communicate with each other via the system bus.

The machine tool 102 is connected with the processing circuitry 104 directly, or indirectly through the communication network 108. The communication network 108 may include a local area network (LAN) or a wide area network (WAN), e.g., the Internet.

The computing device 106 is equipped with one or more accelerometers, and one or more data capture components, e.g., software applications and hardware components, for recording or storing data produced by the one or more accelerometers. The computing device 106 is therefore also referred to as a recording device in this specification.

For example, the one or more accelerometers can measure movement, e.g., movement speeds, acceleration speeds, and changes in acceleration, of the moving component 110 and generate corresponding movement data, as the latter moves along a movement path. The movement data can be stored on a storage unit of the computing device 106, e.g., for local or remote analysis by the computing device 106 or by the user device 120, respectively.

The computing device 106 can be attached to, e.g., mounted to, and detached from the machine tool 102 with reasonable efforts, e.g., by a user or by the machine tool 102. The computing device 106, when mounted on the machine tool 102, can record movement data relevant to the movements of the moving components. In some implementations, the computing device is placed in a casing device, which can be taped the machine tool. In some implementations, the computing device is tape directly to the machine tool.

In some implementations, the computing device 106 may be placed in a casing device, having one or more magnetic strips such that when a user magnetically attaches the casing device to the machine tool 102, the computing device 106 is effectively mounted on the machine tool 102, for the purpose of recording data relevant to the movements of the moving components.

For example, when the electronic device is a smart phone having one or more accelerometers, the casing device can be a smart phone case with magnetic strips capable of retaining the smart phone on a machine tool, while the machine tool moves. For another example, when the electronic device is an evaluation board or a mini data logger, e.g., an MSR 145 data logger, the casing device can be a single magnetic strip.

In some implementations, the computing device 106 may be placed in a casing device that is capable of being mechanically attached to the machine tool 102, such that when a user mechanically attaches, e.g., using clamps, pins, anchors, bolts and nuts, or screws, the casing device to the machine tool, the computing device 106 is effectively mounted on the machine tool 102, for the purpose of recording data relevant to the movements of the moving components.

For example, the casing device can be a housing component that can be attached to and detached from the machine tool; the smart phone can be placed inside in the housing component before it is screwed onto the machine tool, such that the smart phone is mounted to the machine tool and can record the movements of the machine tool. For another example, an evaluation board or a mini data logger can be fastened to the machine tool using clamps to record the movements of the machine tool.

In other implementations, the processing circuitry 104 may generate instructions causing the machine tool 102 to magnetically mount the computing device 106 on the machine tool 102. For example, the machine tool 102 may generate an electromagnetic field that attracts the computing device 106 and retains the attraction of the computing device 106 while moving a movement path. The computing device 106, when magnetically mounted on the machine tool 102, can record data relevant to the movements of the moving components. The computing device 106 also, when magnetically mounted on the machine tool 102, can record data relevant to the movements of the moving components.

In some implementations, the computing device 106 can determine an amount of time the movement of the machine tool 102 (or the moving component 110) takes, e.g., by recording movement data, measuring the total amount of time needed for the machine tool 102 to move the movement prescribed in a selected movement path, and calculating how much time the machine tool 102 took to accomplish a predefined movement. Such calculated times can be output by the computing device 106 to a display component thereof, to a different computing device (e.g., by wireless transmission) for further analysis, or both. In addition, in some implementations, the computing device 106 can also output the recorded movement data of the machine tool 102 (or the moving component 110) to a different computing device, e.g., a remote server or a local computer, for further analysis.

In some implementations, the computing device 106 also includes a display component, e.g., a LCD screen or a touch screen, for display movement data collected by the computing device 106 to a user. This is technically advantageous, as movement data recorded by the computing device 106 can be analyzed and presented to a user locally on the computing device, eliminating or reducing any need for a third device.

The computing device 106 can also be removed from the machine tool 102. For example, a user may detached the casing device in which the electronic device is housed, dismounting the electronic device from the machine tool 102. For another example, the machine tool 102 may discontinue the electromagnetic field retaining the computing device 106 or generate another electromagnetic field that would displace the computing device 106, causing the computing device 106 to be separated from the machine tool 102.

As illustrated by these examples, the computing device 106 (or the one or more accelerometers included therein) can be mounted to and dismounted from the machine tool 102 as-needed, making the process of timing the machine tool 102 more flexible and thus convenient. Also, because the computing device 106 can be portable and function independently from the machine tool 102, movement data collected by and stored on the computing device 106 can be analyzed offsite or offline, without interfering with the machine tool 102's operations. Additionally, installing, calibrating, or upgrading accelerometers installed on the computing device 106 may be more easily achieved than doing the same on the machine tool 106, given the machine tool's increased structural and mechanical complexity.

In some implementations, movement data captured by and stored on the computing device 106 can be transmitted to the user device 120 for analysis. In some implementations, the user device 120 is equipped with appropriate processing power to provide sophisticated data analysis, in order to measure performance limits of the machine tool 102. In some implementations, the user device 120 is equipped with more processing power or more powerful data analysis application, e.g., than the computing device 106 is, for processing movement data recorded and submitted by the computing device 106.

In some implementations, the user device 120 is equipped with appropriate processing power to provide sophisticated data analysis, in order to measure performance limits of the machine tool 102. In some implementations, the user device 120 is equipped with more processing power or more powerful data analysis application, e.g., than the computing device 106 is, for processing movement data recorded and submitted by the computing device 106.

In some implementations, movement data captured by and stored on the computing device 106 can be transmitted to a computing cloud for analysis. For example, when the computing device 106 is a smart phone, the smart phone can connect to the cloud, e.g., via a WIFI, 3G, 4G, or 4G LTE connection, and wirelessly upload data to the cloud server. The cloud can also be connected with the user device 120.

In some implementations, additional features of the system 100 can be provided as disclosed in U.S. Patent Publication No. 2013/0304247, filed Mar. 21, 2013, which is hereby incorporated by reference in its entirety.

Figure 2A:
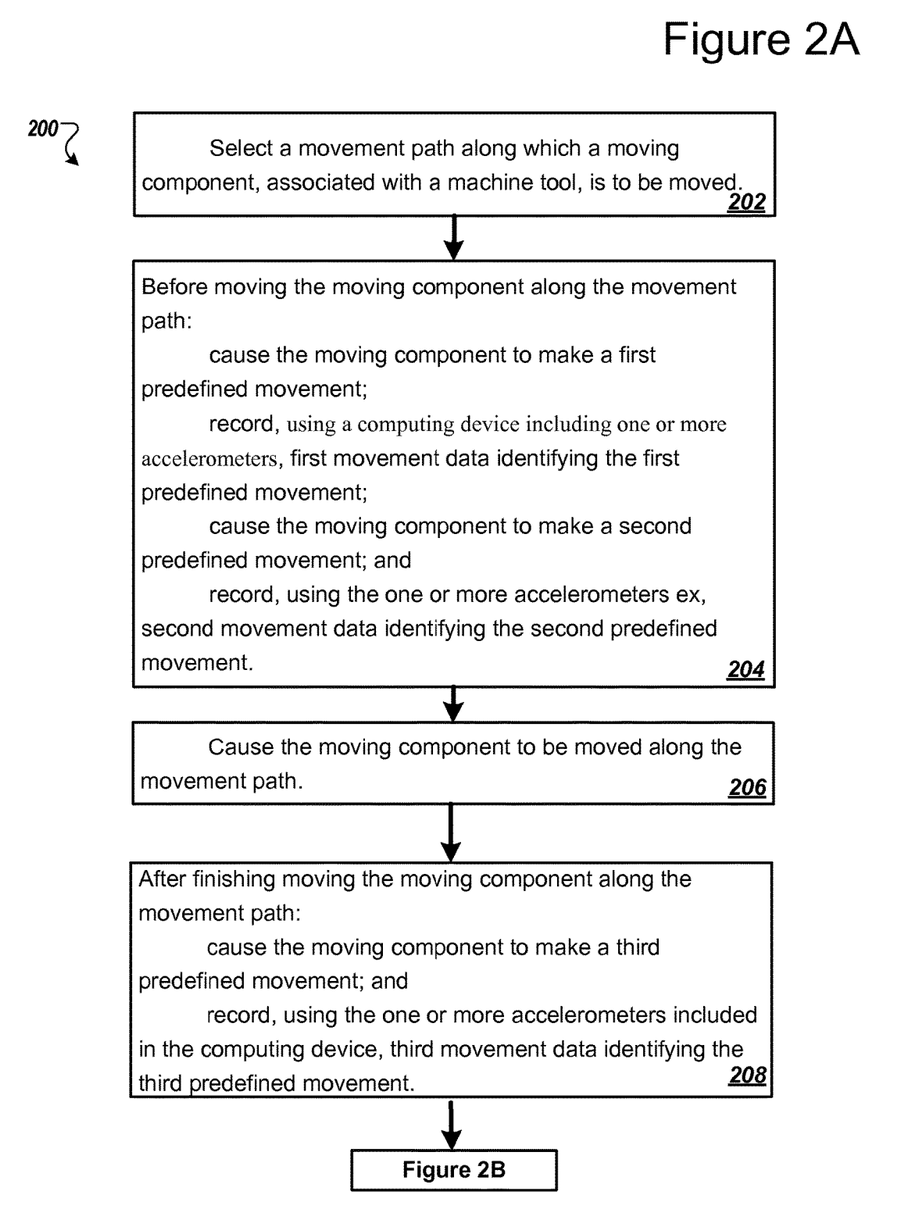
FIGS. 2A-2B are flow diagram showing an example of a process for timing a machine tool using an accelerometer.
Figure 2B:
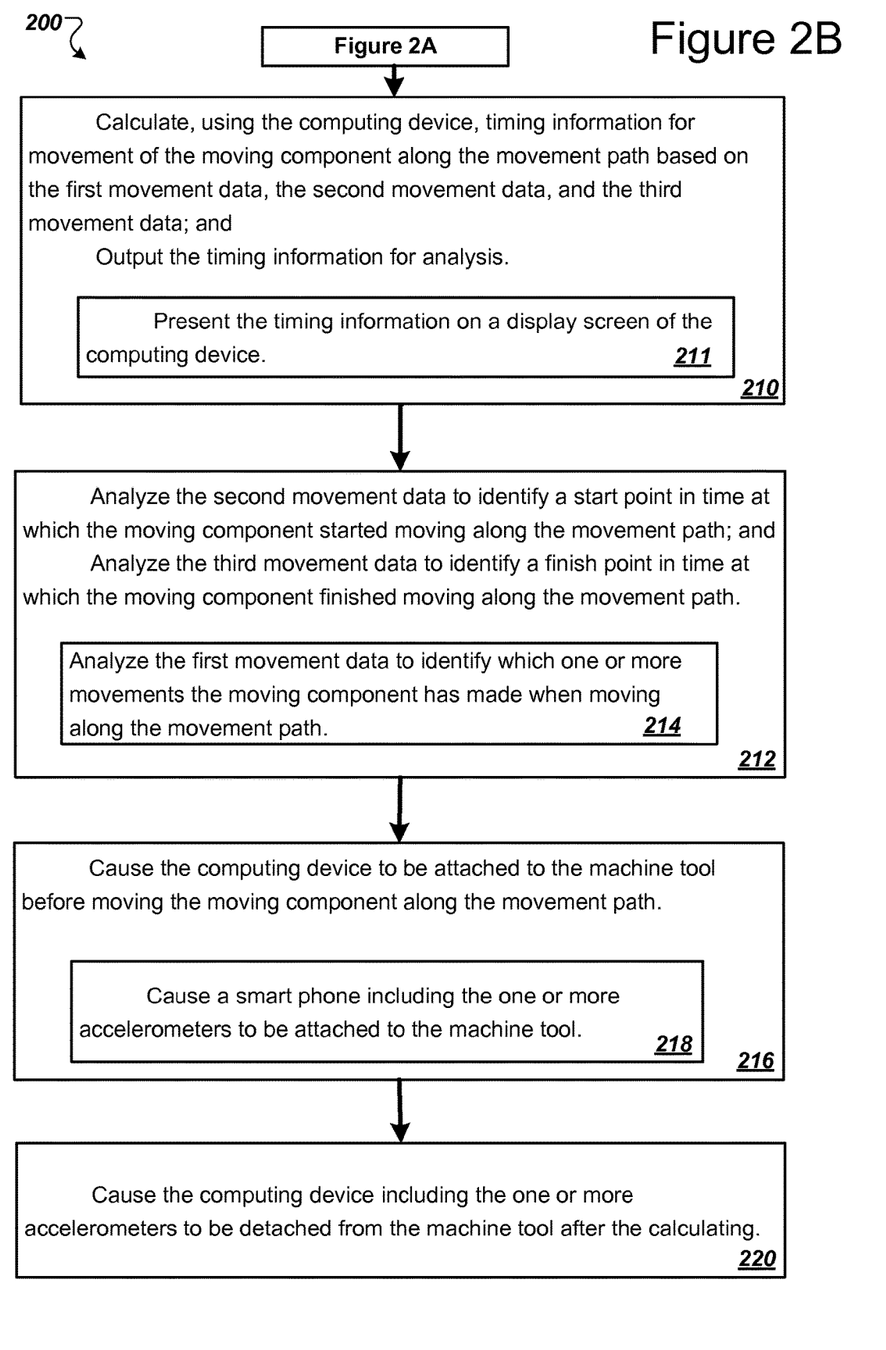

FIGS. 2A-2B are flow diagram showing an example of a process 200 for timing a machine tool using an accelerometer. For convenience, the process 200 will be described as being performed by a system appropriately set up in accordance with this specification. For example, the system 100 of FIG. 1, appropriately programmed, can perform the process 200.

The process 200 begins with selecting, at 202, a movement path along which a moving component, associated with a machine tool, is to be moved. For example, a user can through a user interface of a processing circuit of a machine tool, select a particular movement path, from a set of predefined movement paths; responsive to the user selection, the processing circuitry can load appropriate computer instructions and execute these instructions, causing the machine tool to make movements as prescribed in the particular movement path.

For example, after a user selects a "circle*2 movement" option through the user interface of a processing circuitry, the processing circuitry executes a computer program e.g., written in the C language, causing the machine tool (or the moving component thereon) that it controls to make a circular movement twice.

Before moving the moving component along the movement path, the system 100 causes, at 204, the moving component to make a first predefined movement, which can result in a first acceleration by the moving component. An electronic device equipped with one or more accelerometers can record the first acceleration and accordingly generate first movement data.

Figure 3:
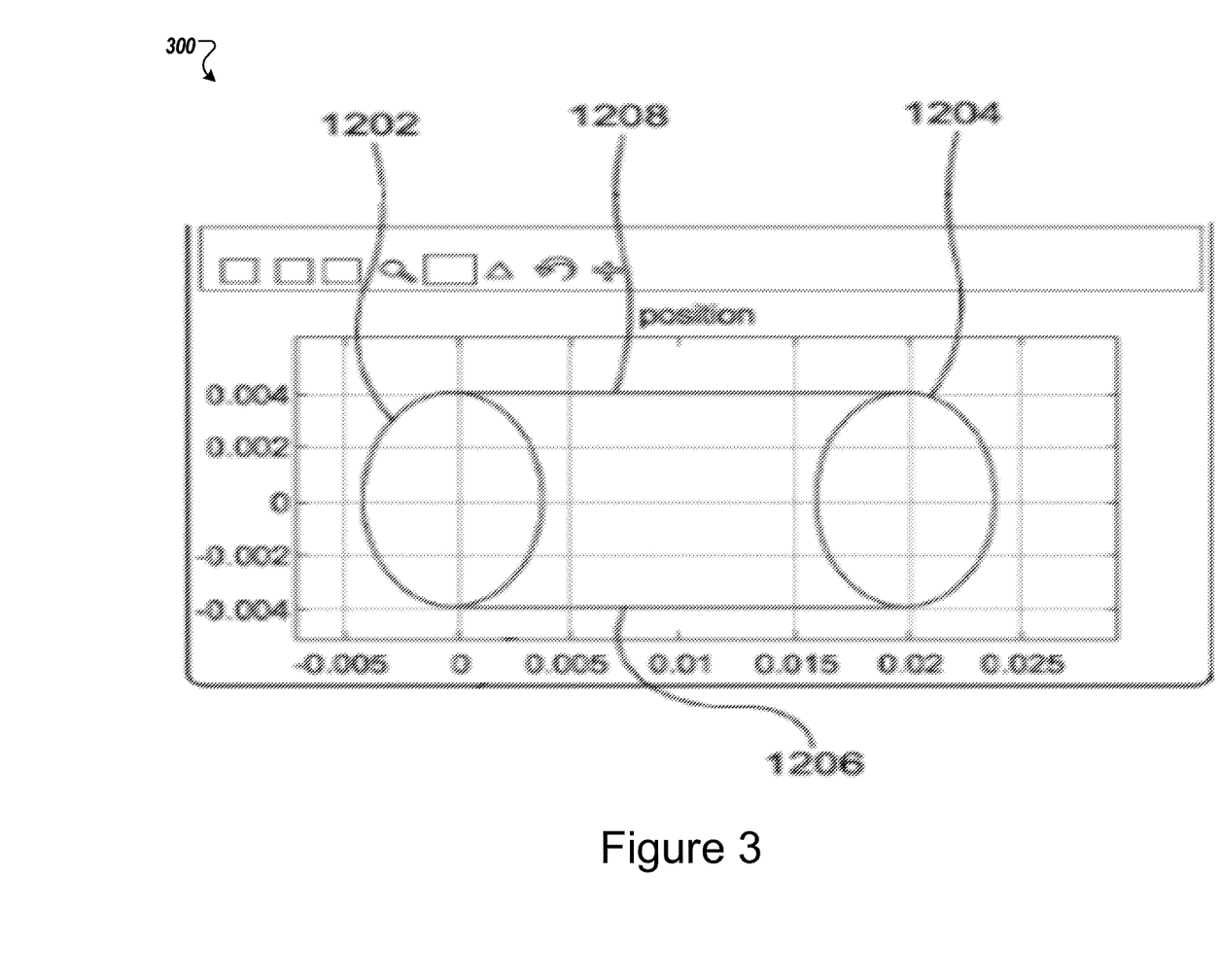
FIG. 3 is a block diagram showing example of machine tool movements that can generate a marker signal.

The first movement data are sometimes also referred to as spectacles or a marker signal, which identifies or encodes which movements are included in the selected movement path or what movement the machine tool is about to perform next. For example, the occurrence of the first acceleration can be determined based on its corresponding wave forms when movement data are analyzed, an example of which is shown in FIG. 3.

Besides generating the spectacles, the system 100 also causes the moving component to make a second predefined movement, before moving the moving component along the movement path. The second predefined movement can result in a second acceleration by the moving component. An electronic device equipped with one or more accelerometers can record the second acceleration and accordingly generate second movement data.

Figure 4:
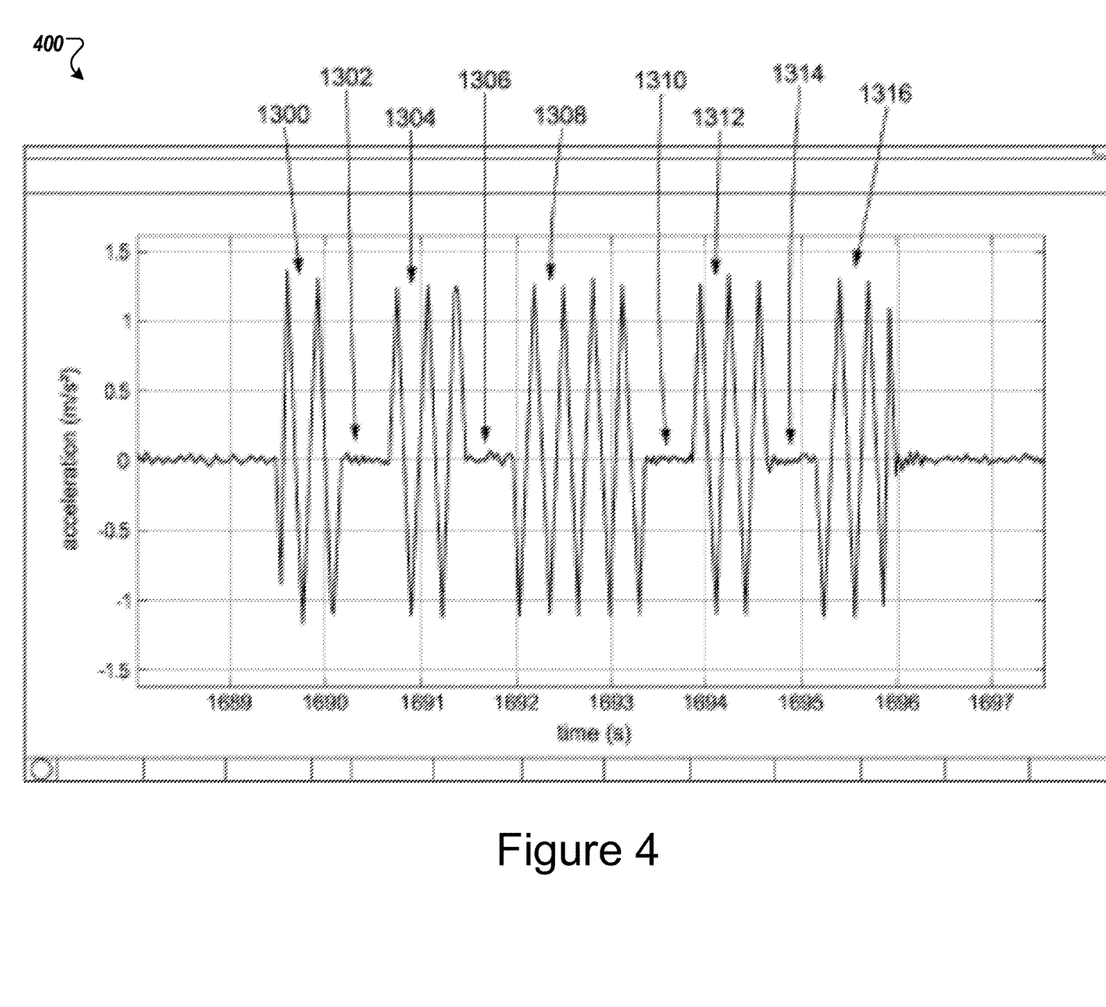
FIG. 4 is a block diagram showing an example of the marker signal generated by the machine tool movements shown in FIG. 3, as recorded by a recording device.

The second movement data are sometimes also referred to as a clover or a start signal, which can be used by a user or a data analysis tool to identify the beginning of a movement path or a test run. For example, the occurrence of the second acceleration can be determined based on its corresponding wave forms when movement data are analyzed, an example of which is shown in FIG. 4.

Based on when the second acceleration occurred, the point in time at which a moving component begins making movement required in the selected movement path can be ascertained or approximated with a predefined degree of certainty, e.g., 0.1 second or 2 seconds after the start signal takes place.

In some implementations, e.g., for ease of identification, a clover signal is characterized by a repeating pattern of four zero crossings: {short, short, short, and long}.

In some implementations, because the second predefined movement serves to generate the start signal, indicating the beginning of the series of movements along the selected movement path, the system causes the machine tool to move as prescribed in the selected movement path after a predefined time proximity to the second acceleration or the start signal. Maintaining a predefined proximity between the second acceleration and the very first movement prescribed in the selected movement path can reduce timing inaccuracy.

After making both the first predefined movement and the second predefined movement (or the first acceleration and the second acceleration, respectively), the process 200 continues by causing the moving component to be moved along the movement path at 206. For example, after receiving instructions from the processing circuitry, the machine tool (or the moving component thereon) makes movements prescribed in the selected movement path, e.g., travelling along all edges of a triangle or making four iterations of a circle.

Note that while moving along the selected movement path, the machine tool (or the moving component) may also accelerate and thus generate acceleration data. These acceleration data may also be recorded and stored by the electronic device as part of the movement data. In some implementations, the movement data includes data other than the acceleration data, e.g., speed data describe the speed at which the moving component is travelling at a given time.

While the moving component is moving along the movement path, the system 100 causes the moving component to make the series of movements prescribed in the selected movement path. The series of movements prescribed in the selected movement path can include different types of movements, e.g., circular movements, elliptical movements, or straight-line movements. The series of movements prescribed in the selected movement path can be determined by analyzing the recorded spectacles or the marker signal. The spectacles can function as a unique identifier, e.g., a bar code, identifying subsequent movements of the machine tool. For example, if the spectacles of a selected movement path includes 5 substantial cross-over from zero, it may be determined that the selected movement path includes one iteration of moving along a triangle shape at a constant speed. In some implementations, the spectacles have 2 possible different lengths, 2 possible radii, and either 1, 2, or 3 circle repeats on either end. Therefore, in some implementations, the spectacles can identify 36 (2*2*3*3) movement paths.

After completing the test run, e.g., finishing moving the moving component along the movement path, the system 100 cause the moving component to make a third predefined movement at 208, which can also result in a third acceleration by the moving component. The recording device can record the third acceleration and accordingly generate third movement data. The third movement data are sometimes also referred to as an end signal, which can be used to identify the end of the movement path or the test run. In some implementations, e.g., for ease of identification, the end signal is also a clover signal. In other implementations, e.g., for ease of distinction, the end signal is a signal different from the clover signal, for example a signal opposite of the clover signal (to allow easier identification). In some implementations, in order to achieve the recognized pattern, the clover must be kept at a fixed acceleration, so feedcodes are used to run the clover at a different actual feedrate to the motion under test. This allows the clover to immediately precede/follow the motion under test, minimizing errors.

Based on analyzing the first movement data, the second movement data, and the third movement data, and their corresponding wave forms, at 210, the system can time machine tool's movements along the movement path. In some implementations, outputting comprises, at 211, presenting the timing information on a display screen of the computing device, e.g., displaying to a user how much time it took for the machine tool to travel a circle with a radius of 6 cm, at the constant speed of 1 cm per second.

For example, the second movement data can identify the beginning of a test run; the third movement data can identify the end of the test run. Therefore, the time duration between the beginning and the end of the test run is approximately the length of time the machine tool took to finish all movements prescribed in the test run.

Based on the duration of the test run and the movements involved in the movement path, the machine tool's performance limits can be determined. For example, the maximum acceleration that a machine tool can provide to its moving component can be determined based on the radius of a circular movement and the moving component's speed when travelling the circle.

In some implementation, the total amount of time it take for the machine tool to complete a movement path includes the time it took to make the clover signals, resulting in timing inaccuracy. To produce more precise timing data, two different timings can be done and subtracted to remove the inaccuracy. For instance, the system may time the following two movement paths: (1) spectacles-clover-11 circles-clover and then (2) spectacles-clover-1 circle-clover. Subtracting the timing needed for the path (2) from that needed for the path (1) can produce the time need for the 10 circles.

In other implementation, where repeating movements are not desirable, e.g., when a movement path is lengthy, the system may time the following two movement paths: (1) spectacles-clover-movement path A-clover and then spectacles-clover-clover (e.g., second timing is for a null movement path). Subtracting the timing needed for the path (2) from that needed for the path (1) can produce the time need for the movement path A.

In some implementations, the one or more accelerometers used to record movement data, in some cases only acceleration data, are not part of the machine tool, as manufactured. For example, the manufacturer did not install the accelerometers on the machine tool. Rather, the accelerometers are installed in a third party device, e.g., a recording device. A recording device can be a portable device, e.g., a smart phone. In these implementations, in order to detect machine tool movement, the recording device on which the accelerometers are installed needs to be attached to the machine tool before a test run.

In some implementations, e.g., for ease of mobility, movement data recorded by the one or more accelerometers are stored on the recording device, rather than on the machine tool or the processing circuitry. Because, as explained above, machine tool and processing circuitries are usually not portable, e.g., due to their weight and structural complexity.

For example, the first movement data, the second movement data, and the third movement data can be stored on the smart phone, where these data can be more readily transmitted or duplicated onto other devices.

In some implementations, the computing device calculates the timing information using its own local processor, e.g., calculate. In some implementations, an offline/offsite processing feature is provided. For example, a recording device can transmit movement data, e.g., the first movement data, the second movement data, and the third movement data, stored thereon to a computing system remote or independent from the machine tool. The computing system can analyze these movement data offsite or offline, without affecting the operations of the machine tool. In some implementations, marker signals can be recognized from the recorded movement data by searching for zero crossings. The recorded movement data includes a time series of accelerations. After appropriate processing, e.g., including filtering to remove noise, the times at which the interpolated acceleration curve crosses the time axis can be identified, as well as the direction of the crossing e.g., whether it is from positive acceleration to negative acceleration or vice versa. The expected series of zero crossing times and directions for a given marker signal is calculated. The series of zero crossings derived from the acceleration data is scanned and then compared to the expected series.

In some implementations, the process 200 also includes, at 212, analyzing the second movement data to identify a start point in time at which the moving component started moving along the movement path; and analyzing the third movement data to identify a finish point in time at which the moving component finished moving along the movement path.

In some implementations, the process 200 additionally includes, at 214, analyzing the first movement data to identify which one or more movements the moving component has made when moving along the movement path.

In some implementations, the process 200 also includes, at 216, causing the computing device to be attached to the machine tool before moving the moving component along the movement path.

In some implementations, causing the computing device to be attached to the machine tool comprises, at 218, causing a smart phone including the one or more accelerometers to be attached to the machine tool.

In some implementations, the process 200 also includes, at 216, transmitting the first movement data, the second movement data, and the third movement data stored on the smart phone for analysis by a second computing device independent from the machine tool.

In some implementations, the process 200 also includes, at 220, causing the computing device including the one or more accelerometers to be detached from the machine tool after the calculating.

FIG. 3 is a block diagram showing example of machine tool movements 300 that can generate a marker signal. As shown in FIG. 3, the series of movements 300 includes a first circle 1202, a second circle 1204 linked by two straight line segments 1206, 1208. In other embodiments, the circles may be ellipses, or other curved closed shapes, but it will be appreciated that embodiments using a circle may be convenient due to the constant radius and therefore constant acceleration in two directions (assuming constant speed round the path).

An example of how spectacles can be used to encode a number is as follows. I some implementations, the spectacles contain two straight lines, and two circles which can be repeated. Two different lengths of straight lines (l1 and l2), two different radii of circle (r1 and r2), and 0, 1 or 2 of repeats of the circles (n1 for the left number and n2 for the right number) can be used. Because, the moving component moves through the spectacles at a known speed, analyzing the times where the acceleration of a particular axis crosses zero (and from which direction it crosses zero) can produce an estimate of the length of the straight line, the radius of the circles and the number of repeats of the circle.

Integers a, b, c, and d can be set as follows:

If the estimated length of the straight line is closer to l1 than l2, a is set to 0; otherwise a is set to 1. The straight line is the line between the two circles. If the estimated radius of the circle is closer to r1 than r2, b is set to, otherwise b is set to 1. The n1 is set to be the number of repeats of the left circle and n2 to be the number of repeats of the right circle. We can then form the number: $C=18*a+9*b+3*n1+n2$.

This example technique allows the encoding a number for C from 0 to 35.

FIG. 4 is a block diagram showing an example of the marker signal 400 generated by the machine tool movements 300 shown in FIG. 3, as recorded by a recording device. For clarity timing data for only one of the axis is shown in FIG. 4.

FIG. 4 shows multiple periods of sine wave followed by flat portions. FIG. 4 shows a machine tool or a moving component has made the following movements: 2.5 revolutions of the circle 1202 (as illustrated by the wave 1300); moving along the straight portion 1208 (as illustrated by the flat portion 1302); 2.5 revolutions of the circle 1204 (as illustrated by the wave 1304); moving along the straight portion 1206 (as illustrated by the flat portion 1306); 4.5 revolutions of the circle 1202 (1308); moving along the straight portion 1208 (1310); 2.5 revolutions of the circle 1204 (1312); moving along the straight portion 1206 (1314); and finally 2.5 revolutions of the circle 1204 (1316).

Figure 5:
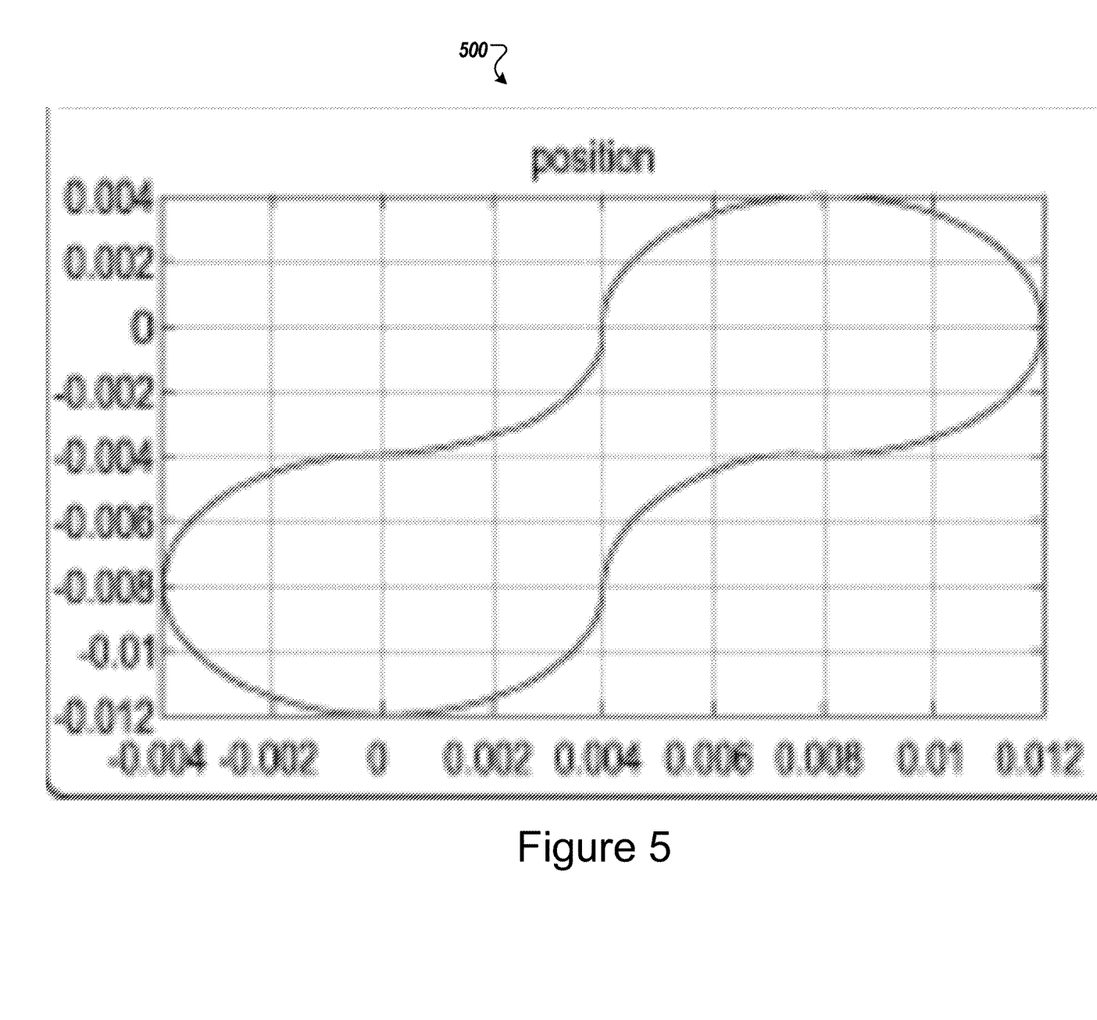
FIG. 5 is a block diagram showing example of machine tool movements that can generate a start signal or an end signal.

FIG. 5 is a block diagram showing example of machine tool movements 500 that can generate a start signal or an end signal.

As can be see, the movements 500 includes elliptical movements that a machine tool can perform to generate a start signal or an end signal, for example, a clover signal, as explained below with reference to FIG. 6.

Figure 6:
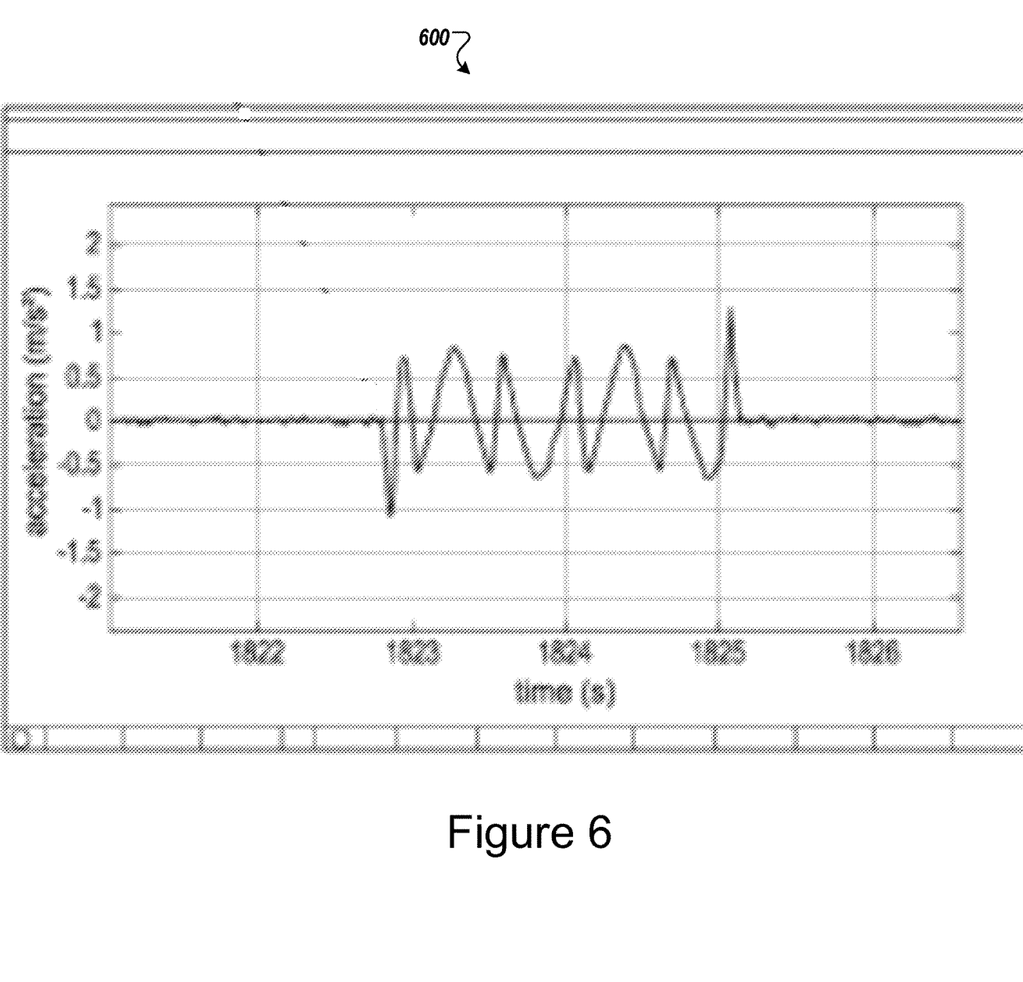
FIG. 6 is a block diagram showing an example of the start signal or the end signal generated by the machine tool movements shown in FIG. 5, as recorded by a recording device.

FIG. 6 is a block diagram showing an example of the start signal or the end signal 600 generated by the machine tool movements 500 shown in FIG. 5, as recorded by a recording device. As shown in FIG. 6, the zero-crossing points of the acceleration have different widths, which form a {short, short, short, long, short, short, long} pattern. This pattern can be used as a clover signal. In other words, this pattern can be used a start signal or an end signal of a test run.

Figure 7:
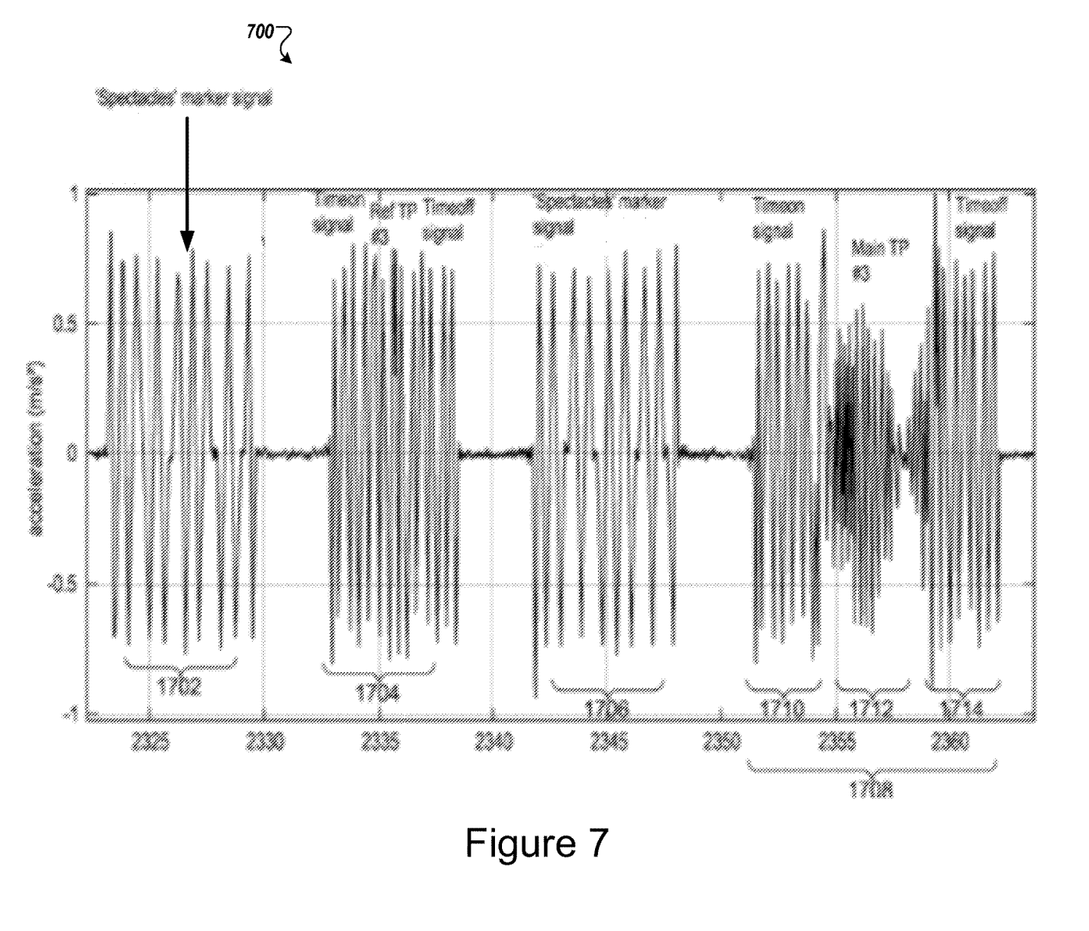
FIG. 7 is a block diagram showing an example of movement data recorded by one or more accelerometers, when a moving component moves along a predefined movement path.

FIG. 7 is a block diagram showing an example of movement data 700 recorded by one or more accelerometers, when a moving component moves along a predefined movement path. As shown in FIG. 7, the movement data 700 includes distinct regions, each of which is explained below.

The first region 1702 represents the spectacles signal generated by causing a moving component of a machine tool to execute the movements shown in FIG. 3. The crossings, number of sine wave and the like is used to encode information indicating what movements are included in a test to be performed by the machine tool.

Next, the region 1704 includes a single loop of the movements shown in FIG. 5, a single circle, followed by another single loop of the movements shown in FIG. 5. Therefore, the region 1704 includes a start signal and a single test loop.

The region 1706 is also generated by causing the moving component to execute the movements shown in FIG. 3.

Lastly, the region 1708 can be interpreted as including three sub regions. The sub-region 1710 is generated by causing the moving component to execute the movements shown in FIG. 5, which serves as a start signal.

The sub-region 1712 is generated by causing the moving component to move around a circular path a plurality of times.

The sub-region 1714 is generated by causing the moving component to execute the movements shown in FIG. 5, which serves as an end signal.

Thus, it can be seen that in the movement data 700, the timing data can signal the beginning and the end of a test run. The timing data can also provide the total time it takes for the moving component to execute a single circular test path (from region 1706) and the time that it takes the moving component to execute multiple circular paths (from sub-region 1712). Thus, the timing data for the circular paths can be processed as explained above to generate machine tool timings.

The circular test path performed in region 1704 may be thought of as a first part of a test. The plurality of circular test paths performed in sub-region 1712 may be thought of as a second part of a test. As described above, the entire test (e.g., the whole test path as represented in the timing data shown in FIG. 7) may be performed a plurality of times. In each instance, a parameter of the test paths, e.g., the radius of the circle, in region 1706/sub-region 1712, or any other parameter may be varied. The radius or other parameter may be encoded within the timing data and for example might be encoded within the test pattern as illustrated in FIG. 3.

In some implementation, identifying a movement path using a marker signal is similar to encoding information using a bar code. Each movement path or test run can be assigned a number, and the number of each movement is saved in a database accessible by the computing device 106, the user device 102, or the machine tool 102. When the timing data is analyzed, the number can be identified from the number of zero crossings in a marker signal and compared to the data in the database to determine what movements have taken place.

In some implementation, accelerations that will be incurred during running movement path is selected between the minimum acceleration that a machine tool can produce and the minimum acceleration that an accelerometer can detect. Therefore, accelerations are small enough so that machine tools can achieve, but still large enough so that they can be detected by the accelerometers.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:

selecting a movement path along which a moving component, associated with a machine tool, is to be moved, the movement path being selected from a set of predefined movement paths;

either before or after moving the moving component along the movement path, causing the moving component to make a first predefined movement;

before moving the moving component along the movement path, causing the moving component to make a second predefined movement;

causing the moving component to be moved along the movement path;

after finishing moving the moving component along the movement path causing the moving component to make a third predefined movement;

recording, using a computing device including one or more accelerometers, movement data resulting from both (a) the movement component making the first predefined movement, the second predefined movement, and the third predefined movement, and (b) the movement component being moved along the movement path;

analyzing the movement data by (a) finding a waveform in the movement data corresponding to the second predefined movement to identify a start point in time at which the moving component started moving along the movement path, (b) finding a waveform in the movement data corresponding to the third predefined movement to identify a finish point in time at which the moving component finished moving along the movement path, and (c) finding a waveform in the movement data corresponding to the first predefined movement to identify which one of the predefined movement paths in the set was selected as the movement path for the moving component;

calculating timing information for movement of the moving component along the movement path based on the identified start point, the identified finish point, and the identified one of the predefined movement paths in the set of predefined movement paths; and determining performance limits of the machine tool based on the timing information for setting parameters of the machine tool used in subsequent generation of cutting paths for the machine tool.

2. The method of claim 1, comprising causing the computing device to be attached to the machine tool before moving the moving component along the movement path.

3. The method of claim 2, wherein causing the computing device to be attached to the machine tool comprises causing a smart phone including the one or more accelerometers to be attached to the machine tool.

4. The method of claim 3, comprising transmitting the movement data stored on the smart phone for analysis by a second computing device independent from the machine tool.

5. The method of claim 1, comprising presenting the timing information on a display screen of the computing device.

6. The method of claim 1, comprising causing the computing device including the one or more accelerometers to be detached from the machine tool after the calculating.

7. A system comprising:
a machine tool including:
a moving component configured to be controlled by a processing circuitry; and
the processing circuitry including:
one or more processors, and
one or more storage units storing first instructions that are configured to cause the processing circuitry to:
select a movement path along which the moving component is to be moved, the movement path being selected from a set of predefined movement paths;
either before or after moving the moving component along the movement path, cause the moving component to make a first predefined movement;
before moving the moving component along the movement path, cause the moving component to make a second predefined movement; and
after finishing moving the moving component along the movement path, cause the moving component to make a third predefined movement; and
a computing device external to the machine tool including:
one or more accelerometers, and
one or more storage units storing second instructions that are configured to cause the computing device to:
record, using the one or more accelerometers, movement data resulting from both (a) the movement component making the first predefined movement, the second predefined movement, and the third predefined movement, and (b) the movement component being moved along the movement path;
analyze the movement data by (a) finding a waveform in the movement data corresponding to the second predefined movement to identify a start point in time at which the moving component started moving along the movement path, (b) finding a waveform in the movement data corresponding to the third predefined movement to identify a finish point in time at which the moving component finished moving along the movement path, and (c) finding a waveform in the movement data corresponding to the first predefined movement to identify which one of the predefined movement paths in the set was selected as the movement path for the moving component;
calculate timing information for movement of the moving component along the movement path based on the identified start point, the identified finish point, and the identified one of the predefined movement paths in the set of predefined movement paths; and
determine performance limits of the machine tool based on the timing information for setting parameters of the machine tool used in subsequent generation of cutting paths for the machine tool.

8. The system of claim 7, the second instructions comprising instructions to cause the computing device to be attached to the machine tool before moving the moving component along the movement path.

9. The system of claim 8, wherein the computing device comprises a smart phone.

10. The system of claim 9, the second instructions comprising instructions to cause the computing device to transmit the movement data stored on the smart phone for analysis by a second computing device independent from the machine tool.

11. The system of claim 7, the second instructions comprising instructions to present the timing information on a display screen of the computing device.

12. The system of claim 7, the second instructions comprising instructions to cause the computing device including the one or more accelerometers to be detached from the machine tool after the calculating.

13. A tangible non-transitory storage medium encoding instructions operable to cause data processing apparatus to perform operations comprising:
selecting a movement path along which a moving component, associated with a machine tool, is to be moved, the movement path being selected from a set of predefined movement paths;
either before or after moving the moving component along the movement path, causing the moving component to make a first predefined movement;
before moving the moving component along the movement path, causing the moving component to make a second predefined movement;
causing the moving component to be moved along the movement path;
after finishing moving the moving component along the movement path, causing the moving component to make a third predefined movement;
recording, using a computing device including one or more accelerometers, movement data resulting from both (a) the movement component making the first predefined movement, the second predefined movement, and the third predefined movement, and (b) the movement component being moved along the movement path;
analyzing the movement data by (a) finding a waveform in the movement data corresponding to the second predefined movement to identify a start point in time at which the moving component started moving along the movement path, (b) finding a waveform in the movement data corresponding to the third predefined movement to identify a finish point in time at which the moving component finished moving along the movement path, and (c) finding a waveform in the movement data corresponding to the first predefined movement to identify which one of the predefined movement paths in the set was selected as the movement path for the moving component;

calculating timing information for movement of the moving component along the movement path based on the identified start point, the identified finish point, and the identified one of the predefined movement paths in the set of predefined movement paths; and determining performance limits of the machine tool based on the timing information for setting parameters of the machine tool used in subsequent generation of cutting paths for the machine tool.

14. The tangible non-transitory storage medium of claim 13, wherein the operations comprise causing the computing device to be attached to the machine tool before moving the moving component along the movement path.

15. The tangible non-transitory storage medium of claim 14, wherein causing the computing device to be attached to the machine tool comprises causing a smart phone including the one or more accelerometers to be attached to the machine tool.

16. The tangible non-transitory storage medium of claim 15, wherein the operations comprise transmitting the movement data stored on the smart phone for analysis by a second computing device independent from the machine tool.

17. The tangible non-transitory storage medium of claim 13, wherein the operations comprise presenting the timing information on a display screen of the computing device.

18. The tangible non-transitory storage medium of claim 13, wherein the operations comprise causing the computing device including the one or more accelerometers to be detached from the machine tool after the calculating.

* * * * *

UNITED STATES PATENT AND TRADEMARK OFFICE
CERTIFICATE OF CORRECTION

PATENT NO. : 10,185,304 B2
APPLICATION NO. : 14/882306
DATED : January 22, 2019
INVENTOR(S) : Stephen William Mackman, Steven Michael Hobbs and William del Strother It is certified that error appears in the above-identified patent and that said Letters Patent is hereby corrected as shown below:

In the Claims

Column 14, Line 41, Claim 1: delete "path" and insert --path,--, therefor.

Signed and Sealed this
Nineteenth Day of March, 2019

Andrei Iancu
*Director of the United States Patent and Trademark Office*